United States Patent
Tank et al.

Patent Number: 5,291,268
Date of Patent: Mar. 1, 1994

[54] METHOD AND APPARATUS FOR DETERMINING A PATH DIFFERENCE IN A MICHELSON INTERFEROMETER

[75] Inventors: Volker Tank, Eching; Helmut Dietl, Munich; Peter Haschberger, Gauting; Erwin Lindermeir, Augsburg; Oliver Mayer, Neubiberg, all of Fed. Rep. of Germany

[73] Assignee: Deutsche Forschungsanstalt Fur Luft- und Raumfahrt, Cologne, Fed. Rep. of Germany

[21] Appl. No.: 874,167

[22] Filed: Apr. 27, 1992

[30] Foreign Application Priority Data

Apr. 27, 1991 [DE] Fed. Rep. of Germany .... 4113842.2

[51] Int. Cl.⁵ .............................. G01B 9/02
[52] U.S. Cl. .................... 356/346; 356/345
[58] Field of Search .......... 356/345, 346, 373, 375, 356/356

[56] References Cited

U.S. PATENT DOCUMENTS

| | | | |
|---|---|---|---|
| 4,355,900 | 10/1982 | Nussmeier | 356/356 |
| 4,799,001 | 1/1989 | Burch | 318/640 |
| 4,870,290 | 9/1989 | Deck | 356/373 X |
| 4,922,307 | 5/1990 | Schaffer | 356/5 |
| 5,082,364 | 1/1992 | Russell | 356/5 |
| 5,114,232 | 5/1992 | Tsuji et al. | 356/346 |
| 5,133,598 | 7/1992 | Badeau | 356/345 |
| 5,157,458 | 10/1992 | Wagner et al. | 356/351 |
| 5,162,661 | 11/1992 | Sato et al. | 250/561 |
| 5,164,788 | 11/1992 | Yoshikawa | 356/346 |
| 5,189,491 | 2/1993 | Sogabe et al. | 356/372 |
| 5,194,919 | 3/1993 | Katayama | 356/375 |
| 5,200,797 | 4/1993 | Tank et al. | 356/363 |

FOREIGN PATENT DOCUMENTS

3503116A1  1/1985  Fed. Rep. of Germany .

*Primary Examiner*—James C. Housel
*Assistant Examiner*—Harold Y. Pyon
*Attorney, Agent, or Firm*—Browdy and Neimark

[57] ABSTRACT

A method and an apparatus are provided for determining a path difference in a Michelson interferometer which comprises at least one reciprocably moving mirror element and an analog to digital converter, and which is provided for the determination of an electromagnetic spectrum without a laser having to be permanently used for that purpose. On the contrary, magnetic, optical and optomagnetical storage media are arranged parallelly to the travel path of the mirror element of the interferometer. A clock track is written on the storage medium in accordance with the sample theorem. In operation a pulse sequence derived from the clock track is read by a read head mounted on the movable mirror element and the desired clock pulse and thus the path information is derived therefrom.

8 Claims, 1 Drawing Sheet

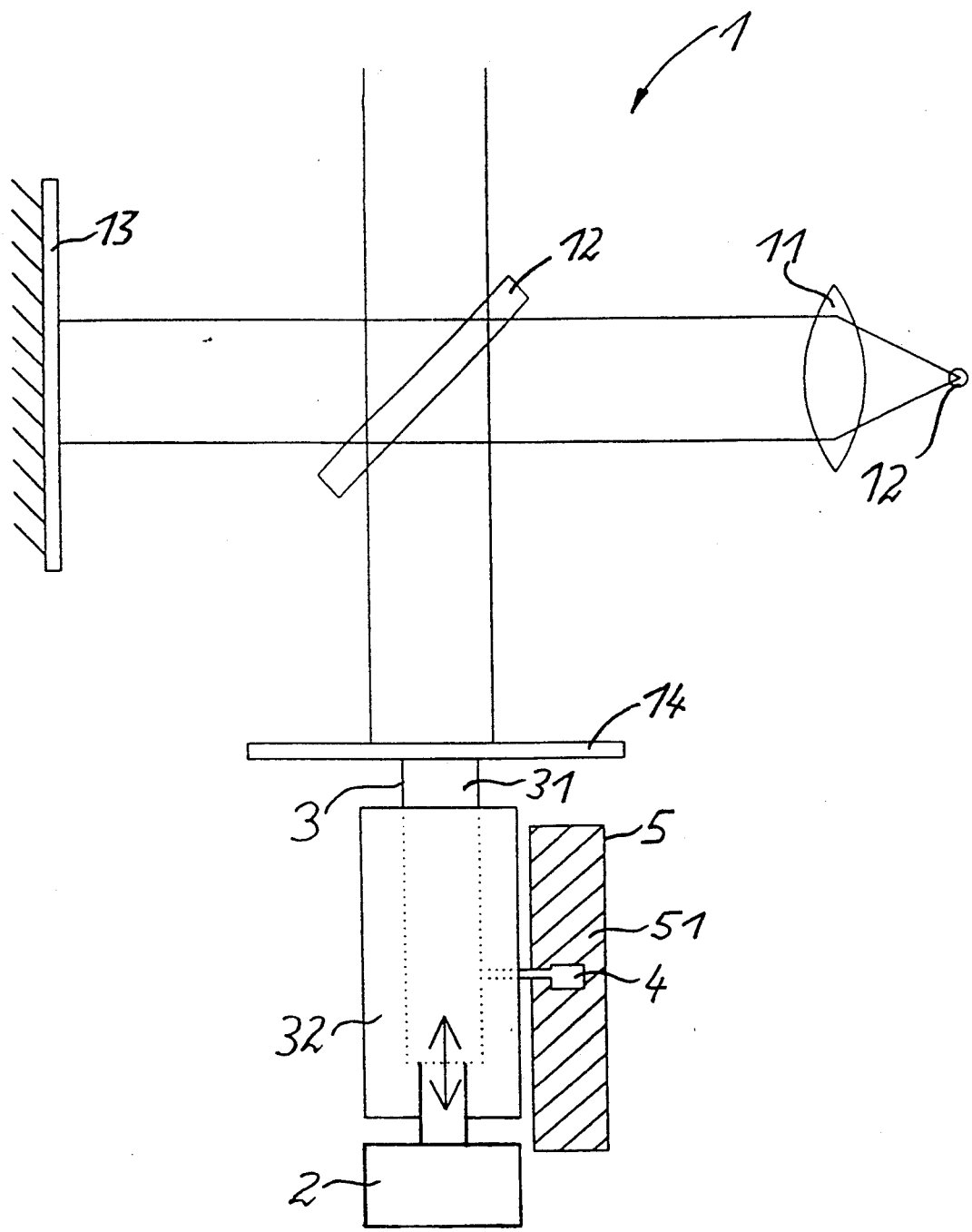

METHOD AND APPARATUS FOR DETERMINING A PATH DIFFERENCE IN A MICHELSON INTERFEROMETER

BACKGROUND OF THE INVENTION

1. Field of the Invention

The invention relates to a method and apparatus for determining a path difference in a Michelson interferometer which comprises a mirror element reciprocatable by means of a drive as well as a detector and an analog to digital converter, and which is provided for determining an electromagnetic spectrum.

2. The Prior Art

An interferometer constructed in this manner and used for the aforementioned purpose is known for example from U.S. Pat. No. 4,799,001. Furthermore, from DE 35 03 116 A1 it is known to use for determining paths and path differences length measuring systems which as optical storage medium comprise a glass scale in the form of a main scale and a scanning head. The main scale is provided parallel to the travel path and in operation a pulse sequence corresponding to a sort of clock track is derived and furnishes a clock pulse as well as path information.

In interferometers of the type described above, at present a path measurement is carried out by means of a laser radiation. The radiation of the laser passes through the interferometer and the path differences are apparent from the resultant interference signal using the knowledge of the wavelength of the laser radiation. A disadvantage with this type of path measurement is that either a reference interferometer for the laser radiation must be coupled to the signal interferometer or the laser radiation must be supplied through the signal interferometer. In the second solution a separate range of the beam splitter must be suitable for the laser radiation. This either restricts the range of the signal radiation or requires the use of larger components, i.e. larger beam splitter, mirrors, lenses, etc.

Furthermore, it is difficult to make a beam splitter which has different optical properties in two geometrically separate regions because the signal radiation usually lies in the infrared range whilst the laser is usually a HeNe laser with a wavelength of 632.8 nm.

Another disadvantage is that the sampling interval in the digitizing is predefined by the wavelength of the laser radiation. The sampling theorem requires a sampling interval which is somewhat less than half the shortest measuring wavelength. If the latter is in the range of integer multiples of the laser wavelength or somewhat therebelow, the sampling increment width must be one half smaller than is actually necessary because it is derived from the laser interferogram and the latter does not permit any finer gradations. As a result, almost twice as many data points than necessary must be recorded and processed. In addition, the bandwidth then is twice as great as necessary and thus the signal to noise ratio achieved is poorer than that theoretically obtainable. In other words, the dimensioning depends on the laser and not on the radiation to be investigated, which would be the optimum case.

It is also disadvantageous that economic laser tubes as a rule have a short life and tubes with long lives are expensive.

SUMMARY OF THE INVENTION

Thus, it is an object of the invention to provide a method for determining a path difference in a Michelson interferometer with which high reliability can be achieved with low expenditure.

This object is accomplished in accordance with the present invention, by a method wherein a clock track having a clock sequence corresponding to the sample theorem is applied on a magnetic, optical or optomagnetic storage medium in that on the surface of the storage medium a pulse sequence is stored which is identical to the pulse sequence which is obtained in a path measurement along the entire travel path of the movable mirror element using a laser associated with the interferometer from the interferences of the laser radiation, the storage medium is arranged parallelly to the travel path of the movable mirror element in such a manner that the pulse sequence is stored in the movement direction of the movable mirror element, on movement of the movable mirror element the pulse sequence stored on the storage medium is read by a read head fixedly connected to the movable mirror element and the read-out pulse sequence is used to control the drive and to trigger the analog to digital converter.

In contrast to the prior art, in which a path measurement was carried out in Michelson interferometers having a reciprocatable mirror element by means of a HeNe laser and the disadvantages referred to at the beginning resulted, in the method according to the invention for determining a path difference in a Michelson interferometer on a magnetic, optical or optomagnetic storage medium a clock track is applied with a clock sequence corresponding to the sample theorem in that on the surface of the storage medium in the movement direction of the mirror element a pulse sequence is stored which is identical to the pulse sequence which is obtained in a path measurement along the entire travel path of the movable mirror element using a laser associated with the interferometer from the laser interferences.

Furthermore, with the method according to the invention the storage medium is arranged parallelly to the travel path of the movable mirror element in such a manner that in operation a pulse sequence corresponding to the clock track is stored in the movement direction of the movable mirror element. On movement of the movable mirror element the pulse sequence applied to the storage medium is read by a read head fixedly connected to the movable mirror element and the pulse sequence read out is then used for driving the drive and triggering the analog to digital converter.

It is a further object of the present invention to provide an apparatus for determining a path difference in such a Michelson interferometer with which high reliability can be achieved with low expenditure.

This further object is accomplished in accordance with the present invention by a device wherein a read head is fixedly connected to the movable mirror element and is arranged in such a manner that during the reciprocation of the movable mirror element it is moved over the storage memory and reads out the stored pulse sequence, and the read-out pulse sequence is used for controlling the drive and for triggering the analog to digital converter.

For this purpose the storage medium rigidly connected for example to a bearing block of the drive motor and said bearing block itself are held at a constant temperature in known manner by means of regulated electrical heating blankets in order in this manner to avoid thermally induced length variations in the travel path to the mirror element and the storage medium. It must further be ensured that the same temperature is maintained both during the assembly and during the storing of the clock sequence.

To exclude influences due to pronounced temperature changes and/or fluctuations, according to a preferred embodiment of the invention a storage medium for example in the form of a magnetic tape is applied in form-locking and force-locking manner to a carrier comprising material largely insensitive to temperature changes and fluctuations, such as Zerodur glass. Furthermore, such a carrier is preferably rigidly connected to the bearing block of the drive motor in the vicinity of the zero position of the movable mirror element.

Thus, in the invention the laser generally employed is replaced by a preservation of a signal which is generated once for example by means of such a laser and which can be read again and again. To produce and generate this preservation an interferometer provided specifically for that purpose can be employed; the storage media provided according to the invention are then incorporated into the interferometers equipped according to the invention during the production. However, it is also possible and conceivable that each individual interferometer is equipped only for the production section with a laser and a beam splitter and detector tuned to the laser; after the recording of the pulse sequence the components no longer required are removed again, such as the laser, the beam splitter tuned thereto and the detector.

In a modification of the embodiment described above a clock sequence can be recorded on the storage medium which is not obtained from a laser interferogram. In this case, to generate the clock sequence a pulse generator of high frequency stability is employed; the frequency is determined in known manner on the basis of the sampling theory from the desired mirror speed and the shortest wavelength to be measured. Such a pulse sequence is then adapted in optimum manner to the interferometer because it depends in its frequency on the shortest measuring wavelength and is not linked to the laser wavelength. In corresponding manner the electrical bandwidth and the characteristic of electrical filters of such an apparatus can then be optimized.

The pulse sequence read in operation is correlated with regard to the position of the movable mirror and can be employed in known manner to control the mirror drive and thus to regulate the mirror speed, for example via a frequency to voltage conversion, and in addition also for triggering an analog to digital converter. To increase the control accuracy a clock frequency representing a multiple of the frequency required can be recorded and then stepped down again in known manner for the triggering.

According to a preferred embodiment, as drive for the movable mirror element a stepping motor (or a linear motor) with a high step number and thus small path increments is employed. The rotary movement of the stepping motor is converted via a threaded rod and a nut with internal thread to a linear movement of the mirror element. Such a motor correspondingly stepped down as required, is driven by a pulse generator highly frequency stable. The pulse generator is operated at high frequency which is stepped down for the motor drive in known manner whilst the high frequency itself is used in the path measurement. The start of a movement of the mirror element and thus of the measurement is for example detected via a light barrier at the moved mirror element. Since the same signal of constant frequency of the pulse generator is used both for the drive of the mirror element and for triggering the sampling, the latter is equidistant with high accuracy.

The pulse sequence is thus read by means of the read head and utilized twice in this manner. Without employing an additional pulse generator it is used in known manner for driving the motor driving the mirror element and for example via a frequency to voltage conversion for regulating the motor speed; it is in addition employed to trigger a following analog to digital converter. In this manner the motor regulates itself and the sampling is effected equidistantly. To increase the regulation accuracy a clock pulse having a frequency which is a multiple of the frequency required can be used, said clock frequency then being stepped down in known manner for the triggering. In addition, a pulse generator can also be employed for driving the motor; the regulation of the motor speed can then for example be effected via a comparison of the frequencies of the pulse generator and the pulse sequence read from the storage medium; the pulse sequence read from the storage medium can then also be employed to trigger the analog to digital converter.

As already mentioned above, with the embodiment described the measurement start may be defined via a light barrier at the moving mirror element or also by a corresponding mark on the storage medium.

DETAILED DESCRIPTION OF THE DRAWING

The invention will be explained in detail below by means of a preferred exemplary embodiment making reference to the attached drawing which shows schematically an interferometer which is provided with an apparatus according to the invention.

In the Figure an interferometer 1 comprises a beam splitter 12 which is arranged at 45° to two plane mirrors 13 and 14 perpendicular to each other. Of these two mirrors, the one plane mirror 13 is stationary whilst the other mirror is constructed as a parallelly displaceable mirror element 14. A bearing 3 for the movable mirror element 14 has a mirror holder 31 and a schematically indicated guide 32. A motor 2 illustrated as block is associated with the guide 32 and the reciprocal movement of the mirror element 14 produced by the motor 2 is indicated by an arrow provided with two tips.

Mounted on the mirror holder is a read head 4 which is moved together with the mirror element 14 carried by the mirror holder 31 over a storage medium 5 associated therewith. The storage medium 5 may be formed by magnetic tape 51 which is applied in a force-locking and form-locking manner to a carrier which is not shown in detail and which consists of a material insensitive to temperature changes and/or fluctuations, such as Zerodur glass. This applies in analogous manner of course also to all the other mirror elements referred to above.

Furthermore, to ensure as far as possible that temperature changes and/or fluctuations have no appreciable effect on the measurement and determination of the path difference in Michelson interferometers, the read head 4 is disposed on the bearing block 3 in the vicinity of the zero position of the travel path of the mirror element 14. The interferometer 1 indicated only schematically further comprises a convergent lens 11 and a detector 10.

In the production of the interferometer 1 a pulse sequence is stored on the storage medium 5 synchronously with the movement of the mirror element 14 and is obtained for example from the interferogram of a laser radiated into the interferometer 1 or a laser radiated into a corresponding interferometer. Preferably, said pulse sequence is derived from a highly stable pulse generator. In the selection of the laser or the frequency of the pulse sequence and the number of pulses per path increment the procedure adopted is that known in interferometers.

As storage medium an optical WORM (Write Once Read Multiple) memory is employed; optical memories are however also suitable, for example the so called compact discs or also magnetic memories in the form of floppy discs, floptical discs or fixed discs. Fundamentally, to carry out the method according to the invention and in the apparatus according to the invention any memory may be used of which the content is read out by a relative movement between the read head 4 and the storage medium 5.

During operation the read head 4 reads out the stored pulse sequence on movement of the mirror element 14. This pulse sequence is further processed in the same manner as the pulse sequence obtained otherwise by means of a laser. The clock pulse can be used both for triggering an analog to digital converter, not illustrated, and for controlling the drive motor 2 of the mirror element 14. Furthermore, a higher-frequency clock pulse can also be obtained from the laser signal and recorded, which is for example more suitable for the drive control, and the low-frequency clock pulse required for an analog to digital converter can be derived by stepping down the higher-frequency clock pulse.

The interferometer here is of course so configured that a reliable adjustment and fixing of the individual components is ensured and consequently the correct association of clock pulse and a path measurement derived therefrom guaranteed. This can for example be achieved by means of locating pins which ensure a rigid reproduceable connection between the bearing block 3 and the storage medium or between the moving mirror element 14 and the read head 4.

Furthermore, it is advantageous with the path measurement obtainable with the invention that further information can be stored in the storage medium 5, for example a marking of the zero or start position and other data utilizable for controlling the interferometer 1. Also, several different clock sequences can be stored on different tracks and this is particularly advantageous when interferometers permit the setting of different spectral resolutions, this in turn resulting in different path differences and thus interferograms with a different number of measuring points. For example, for each adjustment a corresponding clock sequence can be stored on different tracks of the storage medium 5; for this purpose, it is then possible to provide either several fixed read heads or a single fixed read head adjustable perpendicularly to the movement direction.

The advantages which can be achieved with the method according to the invention can be documented impressively with the aid of anumerical example: The storage density for example of a CD-ROM (Compact Disk-Read Only Memory) is about 1 bit/1.25 $\mu$m. To correspond to the sample therorem, about three sample values per period must be available; with a linear drive, for example the drive 2, an operation at signal wavelengths of about $\geq 4$ $\mu$m is thus possible.

Furthermore, it is particularly advantageous according to the invention that the increment width for the digitizing is optimized in accordance with the sample theory and the electronics are also optimized as regards the filters used and the bandwidths provided, etc., and can use not only integer multiples of a laser wavelength.

What is claimed is:

1. Method for determining a path difference in a Michelson interferometer provided for electromagnetic spectrum determination and which includes a reciprocatively moving mirror element, a detector and an analog to digital converter, said method comprising the method steps of:

providing a clock track having a clock sequence on a storage medium so as to store on the surface of said storage medium a stored pulse sequence which is identical to a pulse measurement sequence obtained in a path measurement along the entire travel path of the reciprocatively moving mirror element while using a laser associated with the interferometer from the interferences of the laser radiation, arranging said storage medium parallelly to the travel path of the reciprocatively moving mirror element in such a manner that said stored pulse sequence is stored in a movement direction of the reciprocatively moving mirror element, moving the reciprocatively moving mirror element and reading said stored pulse sequence on said storage medium by using a read head fixedly connected to the reciprocatively moving mirror element, and using a readout pulse sequence to control a drive and to trigger the analog to digital converter.

2. Apparatus for determining a path difference in a Michelson interferometer provided for electromagnetic spectrum determination and which includes a movable mirror element, a detector, an analog to digital converter and an interferometer laser, said apparatus comprising:

a storage medium having a clock track which includes a clock sequence on the surface of said storage medium, said clock sequence being in the form of a pulse sequence which is identical to a pulse measurement sequence, said pulse measurement sequence being obtained by a path measurement along an entire travel path of movement of the movable mirror element while using interferences of radiation from the interferometer laser;

said storage medium being arranged parallelly to the travel path of the movable mirror element in such a manner that said pulse sequence is stored in a movement direction of the movable mirror element;

a read head fixedly connected to the movable mirror element and arranged in such a manner that during the reciprocation of the movable mirror element, said read head is moved over a storage memory and reads out said stored pulse sequence, and said read-out pulse sequence is used for controlling a drive and for triggering the analog to digital converter.

3. Apparatus according to claim 2, wherein said storage medium is in the form of a magnetic strip applied in a form-locking and force-locking manner to a carrier of a material substantially insensitive to large temperature fluctuations, and said carrier is connected rigidly to a bearing block of said movable mirror element and is adjacent to a zero position of said movable mirror element.

4. Apparatus according to claim 2, further including a stepping motor for driving said mirror element, said stepping motor being provided with a high step number and thus having a small path increment, and means for driving said stepping motor comprising a high frequency-stable pulse generator driven with a high frequency signal which can be stepped down for the operation of said stepping motor.

5. Apparatus according to claim 2, wherein said storage medium is a magnetic storage medium.

6. Apparatus according to claim 2, wherein said storage medium is an optical storage medium.

7. Apparatus according to claim 2, wherein said storage medium is an optomagnetic storage medium.

8. Apparatus according to claim 3, wherein said carrier is Zerodur glass.

* * * * *